UNITED STATES PATENT OFFICE.

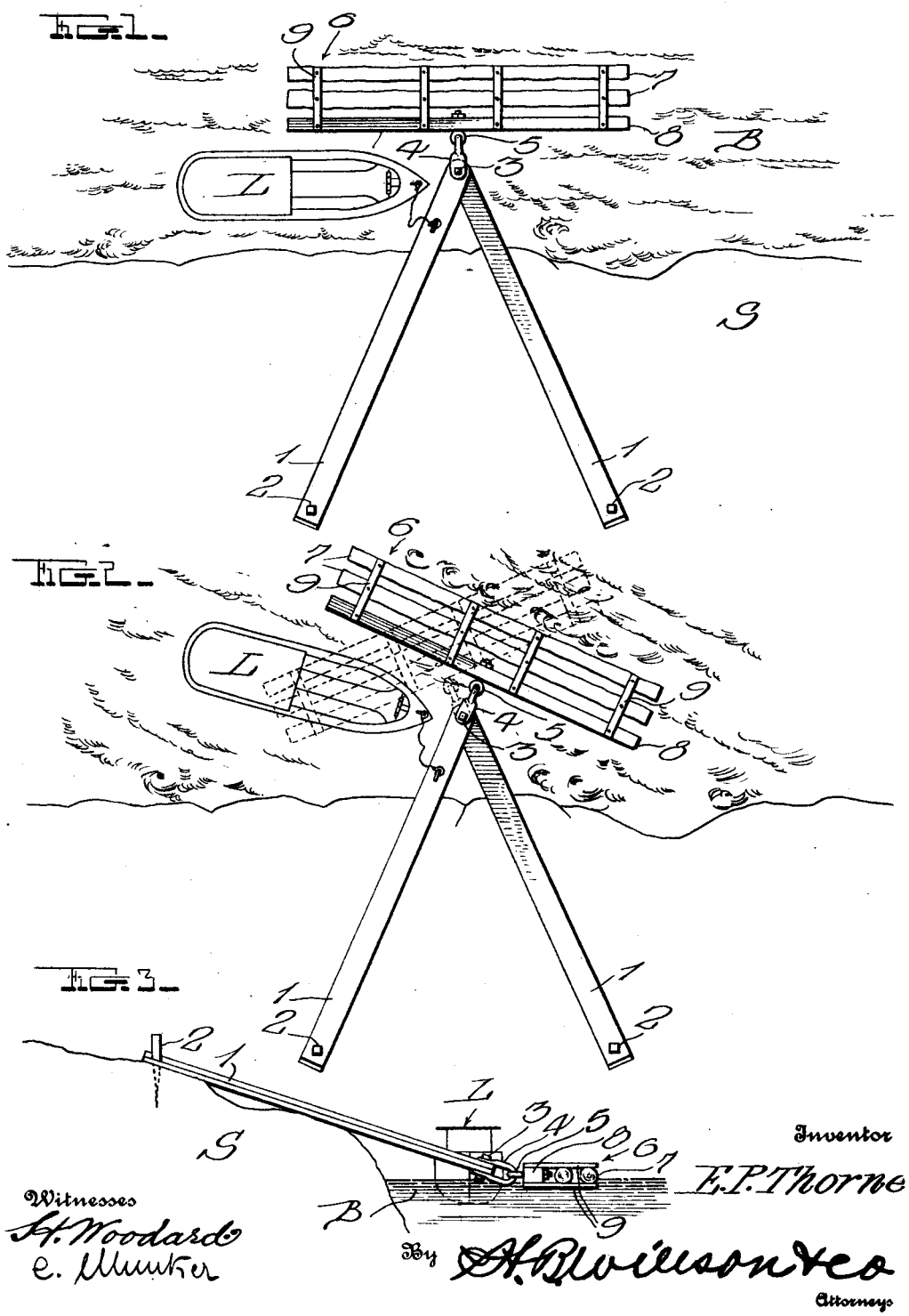

EDWIN P. THORNE, OF FOREST CITY, SOUTH DAKOTA.

PORTABLE HARBOR.

1,184,149.	Specification of Letters Patent.	Patented May 23, 1916.

Application filed December 21, 1914. Serial No. 878,413.

*To all whom it may concern:*

Be it known that I, EDWIN P. THORNE, a native-born citizen of the United States, residing at Forest City, in the county of Potter and State of South Dakota, have invented certain new and useful Improvements in Portable Harbors; and I do declare the following to be a full, clear, and exact description of the invention, such as will enable others skilled in the art to which it appertains to make and use the same.

My invention relates to improvements in harbors and has for its object to provide a simple and inexpensive harbor which may readily be transported from place to place and which, when in use, will effectively protect motor boats, canoes, and other small craft, against injury or swamping which might otherwise be caused by the action of heavy wind storms and rough water. To the above end, I employ certain novel features of construction and combination herein described and claimed and shown in the accompanying drawings wherein:—

Figure 1 is a top plan view showing the application of the invention to use, it being shown in one of its adjusted positions; Fig. 2 is a view similar to Fig. 1 but showing another position; and Fig. 3 is a side view of the invention applied to use.

In these drawings, forming a part of this application, the letter S designates the shore bordering a body of water B. Projecting outwardly from the shore S, a suitable distance above the water, is a pair of outwardly converging bars or planks 1 whose inner ends are provided with openings through which stakes 2 may be driven, thereby retaining them in fixed relation. The outer ends of the bars 1 overlap each other and are held in this position by a bolt 3 which passes through both of these ends and through the parallel arms of a U-shaped clip 4, the latter being passed through a loop 5 which is secured by any appropriate means to a raft structure 6, whereby this structure is pivotally connected with the bars 1. The raft 6 is here shown as formed of a plurality of logs 7 and a rectangular timber 8, the latter being located adjacent the shore but being spaced a considerable distance outwardly therefrom, said logs and bar being connected at intervals by transverse tie beams 9. With the parts constructed in this manner, the raft may be positioned as seen in Fig. 1 when the waves are coming directly in shore and the launch L or other boat, may be run in between the shore and said raft, whereby the latter will break the force of incoming waves and will prevent the same from damaging or swamping the boat. If the waves are coming in toward the shore at an angle other than a right-angle, the raft may be swung to the position seen in full lines in Fig. 2 or to that seen in dotted lines in this figure, the direction in which the raft is swung, being determined by the direction of the waves. In either case, the boat will be fully protected.

I have described certain details of construction for reducing the invention to an operative structure, but it will be readily understood that I need not be limited to such details other than as specified in the appended claims.

I claim:—

1. A harbor comprising a support to be anchored to the shore and to extend therefrom above a body of water, and an elongated raft pivoted centrally between its ends to said support, said ends of the raft being free, thus allowing it to be presented broadside to incoming waves regardless of the angle at which the latter travel, such waves having no tendency to turn the raft around its pivot, due to the location of the latter centrally between the ends of the raft.

2. A harbor comprising a pair of converging bars to be secured at their widely spaced ends to the shore, their other ends being overlapped and adapted to be disposed above a body of water, a U-shaped clip embracing the overlapped ends of the bars, a bolt passing through the ends of the clip and through said overlapped ends of the bars, an elongated raft, and a loop secured to one side of said raft centrally between its ends and receiving the clip, the ends of the raft being free, thus allowing it to be presented broadside to incoming waves regardless of the angle at which the latter travel, such waves having no tendency to turn the raft around its pivotal mounting, due to the location of the latter centrally between the ends of said raft.

In testimony whereof I have hereunto set my hand in presence of two subscribing witnesses.

EDWIN P. THORNE.

Witnesses:
WILLIAM SCHOOF,
BESSIE SCHOOF.

Copies of this patent may be obtained for five cents each, by addressing the "Commissioner of Patents, Washington, D. C."